United States Patent [19]
Herd

[11] 3,758,072
[45] Sept. 11, 1973

[54] SEALING ARRANGEMENT
[75] Inventor: David P. Herd, Houston, Tex.
[73] Assignee: Rockwell Manufacturing Company, Houston, Tex.
[22] Filed: Feb. 16, 1971
[21] Appl. No.: 115,621

[52] U.S. Cl. ............... 251/332, 137/333, 277/171, 277/188
[51] Int. Cl. ............................................. F16k 1/38
[58] Field of Search .................. 277/188, 170, 171, 277/165; 251/332, 357, 360, 368; 137/516.29, 625.5

[56] References Cited
UNITED STATES PATENTS

| 3,269,737 | 8/1966 | Freese | 277/177 X |
| 3,057,630 | 10/1962 | Sneed | 277/165 |
| 2,961,278 | 11/1960 | Newhall | 277/188 X |
| 3,103,366 | 9/1963 | Dunn | 277/188 X |
| 3,218,087 | 11/1965 | Hallesy | 277/188 X |
| 3,382,894 | 5/1968 | Shurtleff et al. | 277/165 X |
| 3,540,472 | 11/1970 | Brady et al. | 137/516.29 |

Primary Examiner—Samuel B. Rothberg
Attorney—Murray Robinson and Ned L. Conley

[57] ABSTRACT

Sealing arrangement comprising a semi-rigid seal ring sealed to its supporting member on upstream side by an elastomer ring to prevent expansion and extrusion of seal ring by fluid pressure when tapered supporting member is moved mechanically to disengage tapered seal ring from surface with which it seals. Arrangement is useful in actuators for diverters for through flow line tools in oil wells.

11 Claims, 5 Drawing Figures

David P. Herd
INVENTOR.

BY Murray Robinson
ATTORNEY

PATENTED SEP 11 1973 3,758,072

David P. Herd
INVENTOR.

BY Murray Robinson
ATTORNEY

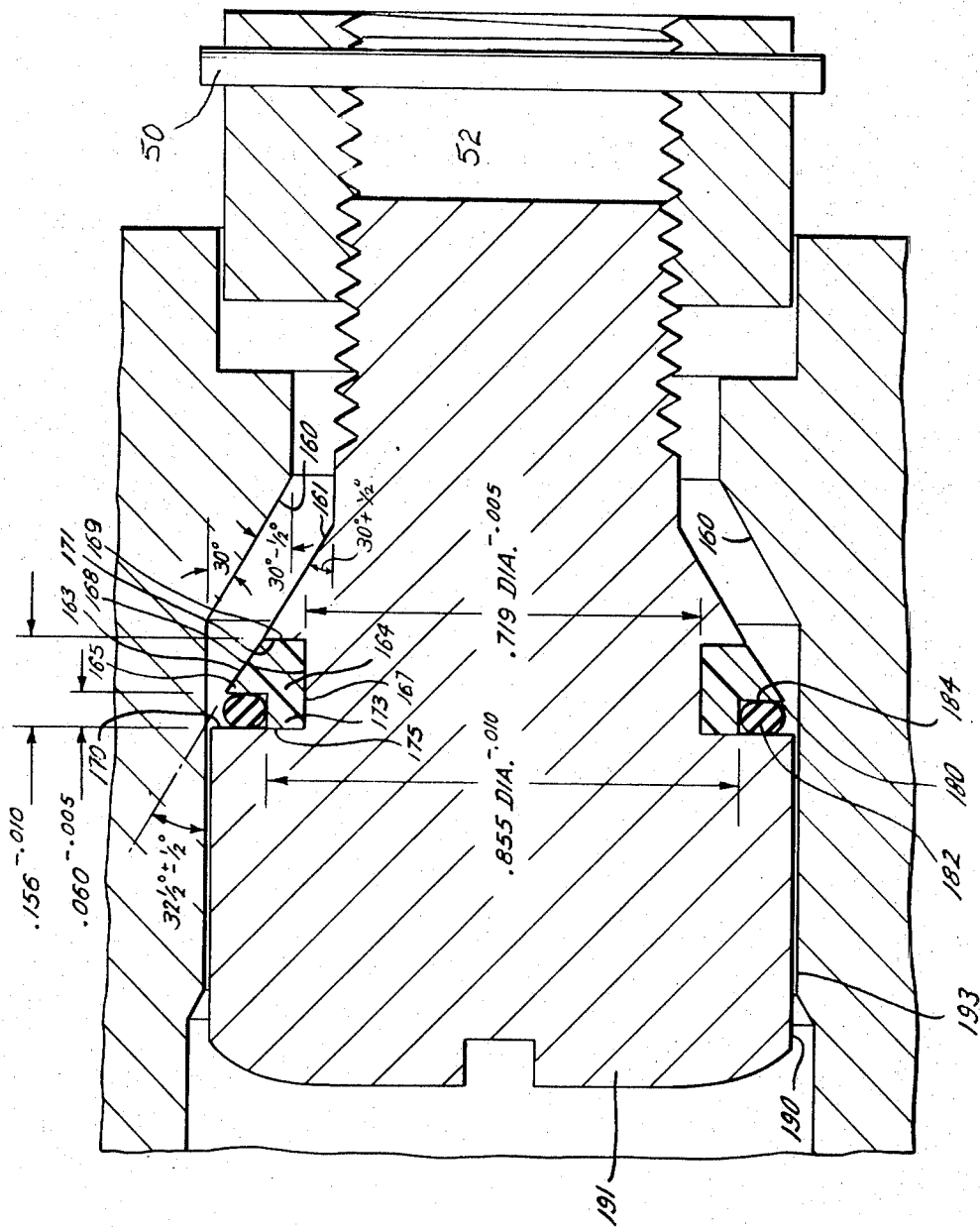

3,758,072

SEALING ARRANGEMENT

BACKGROUND OF THE INVENTION

1. Field of the Invention

This invention pertains to seals, and more particularly to seals for poppet valves.

2. Description of the Prior Art

Poppet valves of the type employing an annular conically tapered metal seat receiving and making a metal to metal seal with a circular perimeter metal closure member having a conically tapered seating surface are well known. It is also well known to provide a seal ring around either the tapered seat or the tapered closure or both in order to effect a better seal. Some examples of such valves are disclosed in U. S. Pat. Nos. 1,725,297, 2,495,880, 3,039,488, 3,063,467, 3,409,039, 3,483,885. In some of these the seal ring has a different taper from the metal to metal seal to provide an initial quick seat.

It is also known to provide seal rings of metal or of softer packing material around a piston movable in a cylinder to effect a seal therebetween. Examples of such construction are the seals shown in U. S. Pat. No. 2,060,847. It is known to make such seals of rubber, as disclosed in the aforementioned patents and also to make them of other materials such as polytetrafluorethylene ("Teflon"), as disclosed in U. S. Pat Nos. 2,817,562, 3,030,753, 3,212,411, 3,445,393. The seals can be either snapped into grooves or mechanically secured as in some of the previously listed patents or may be bonded or pressured into place as shown in U. S. Pat. Nos. 2,710,237, and 2,747,905.

Composite seals employing two or more seal rings, e.g. a rubber O-ring and a Teflon ring are also known as shown in U. S. Pat. Nos. 2,726,104, 2,907,590, 2,973,978, 3,057,629 and 3,057,630 in connection with sealing between two cylindrical surfaces or between two flat surfaces.

It is known to use hydraulic piston and cylinder means as a motor to actuate another device, such as a diverter valve, as shown in A.S.M.E. publication 69 Pet 4, Diverters for T.F.L. tools, by Drouin and Fowler, and in U. S. Pat. No. 3,472,317. Instead of a sealed cylindrical piston as shown in the latter patent, it is also known to use a throttling piston wherein initially there is clearance between the piston and cylinder with fluid flow through the clearance space, the resultant pressure drop effecting a pressure differential to move the piston. When the piston reaches the end of its stroke, a conical end or valve closure thereon engages a conical valve seat to prevent further flow of hydraulic fluid. Difficulty has been experienced with the latter construction. If the piston valve is mechanically moved off its seat, e.g. by tool pressure against the diverter flapper, if mispositioned, the hydraulic fluid (perhaps 300 psi) acts on the O-ring seal to extrude it between the closure and seat or to expand it radially out of its retention groove.

SUMMARY OF THE INVENTION

According to the invention a seal ring for a poppet type valve having a conical seat and a conical seating surface on the clsoure includes a Teflon ring on the closure having an outer periphery tapered at a greater angle than the metal sealing surface and cured in situ. A rubber O-ring is disposed in an annular groove formed between an annular rabbet around the large end of the Teflon ring and the adjacent side of the annular retaining groove in the metal closure. The O-ring does not contact the seat. It functions to seal between between the Teflon ring and the side of the closure. This prevents hydraulic pressure from getting inside the Teflon ring where it could expand it radially and extrude it into the crack between closure and seat when the metal part of the clsoure is off its seat while the large end of the Teflon ring is still sealing with the seat.

Although originally designed for use in a diverter valve operator, the seal construction can be used in other operators employing a throttling piston and tapered valve seat, or in connection with any similar construction using a tapered seat and closure.

BRIEF DESCRIPTION OF THE DRAWING

FIG. 5 is a section through an operator for a diverter valve similar to that of FIGS. 1—4 but incorporating the improved seal means of the invention.

DESCRIPTION OF THE PREFERRED EMBODIMENT

Figure 1:
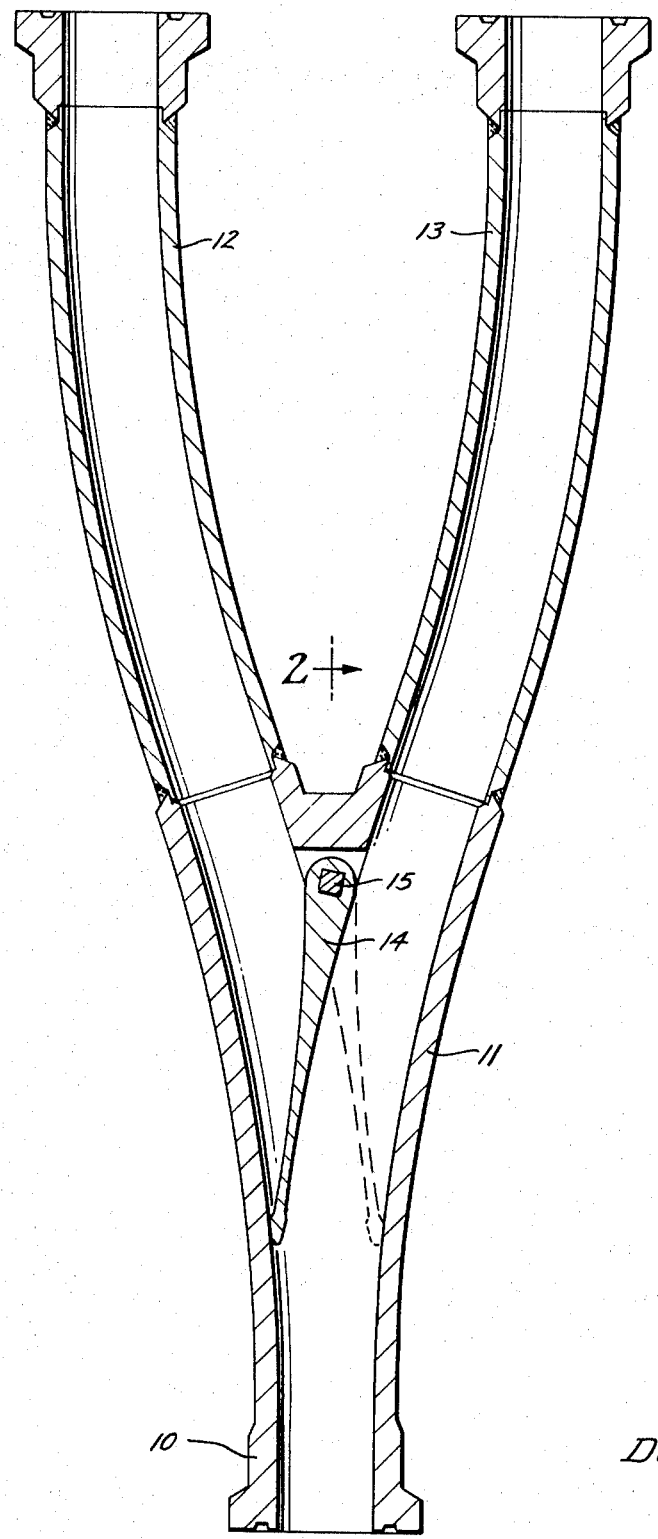
FIG. 1 is a sectional view through a diverter valve operator showing prior art construction.

Reference will first be made of FIGS. 1-4 to describe the prior known hydraulic operated diverter valve. Referring to FIG. 1 there is shown a diverter valve including a tubular trunk portion 10, a flaring tubular transition portion 11 and two tubular branch portions 12 and 13. A diverter paddle 14 is secured to shaft 15 for oscillating motion between the position shown wherein branch 12 is blocked with a free passage from the trunk 10 to branch 13 and a position wherein the paddle blocks branch 13 leaving branch 12 open (shown in dashed lines).

Figure 2:
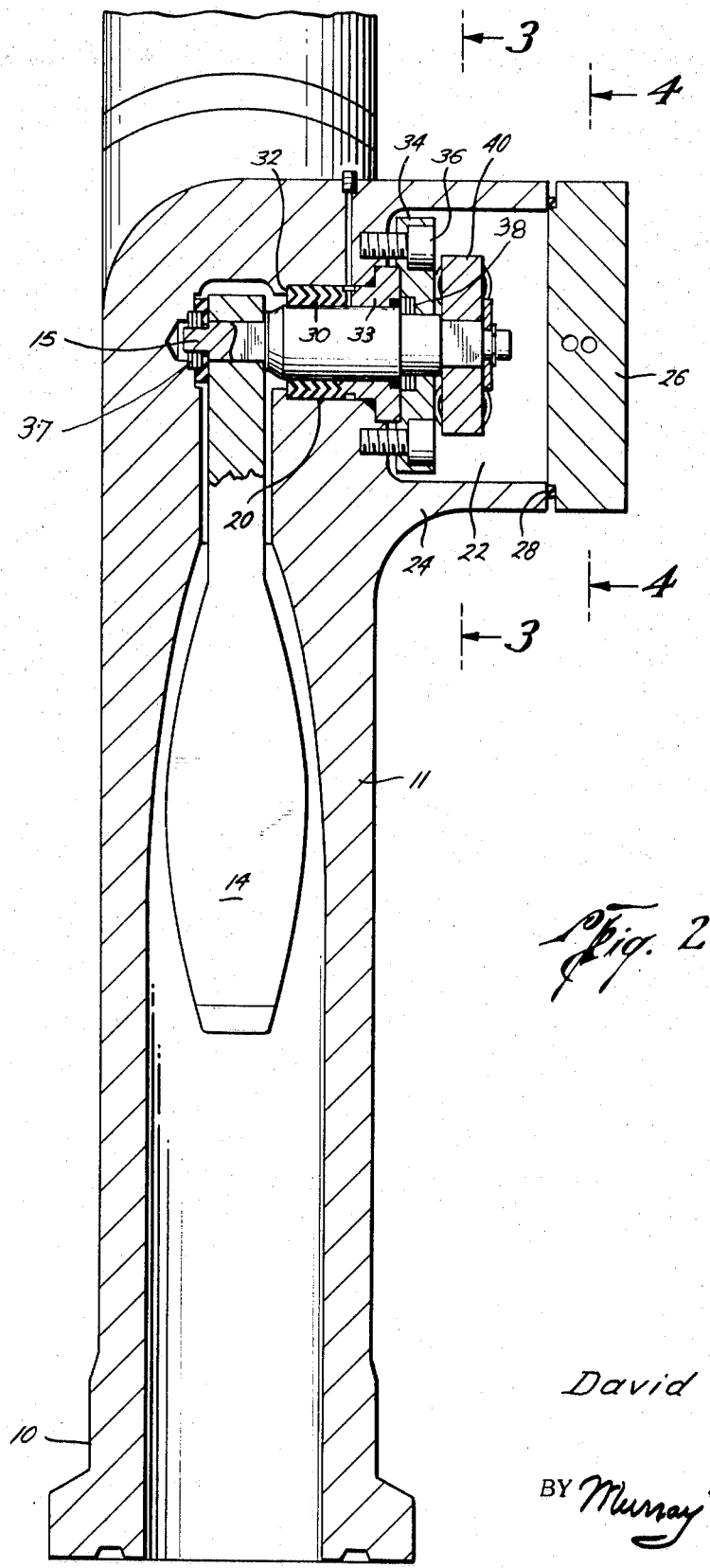
FIG. 2 is a section at plane 2—2 of FIG. 1.
Figure 4:
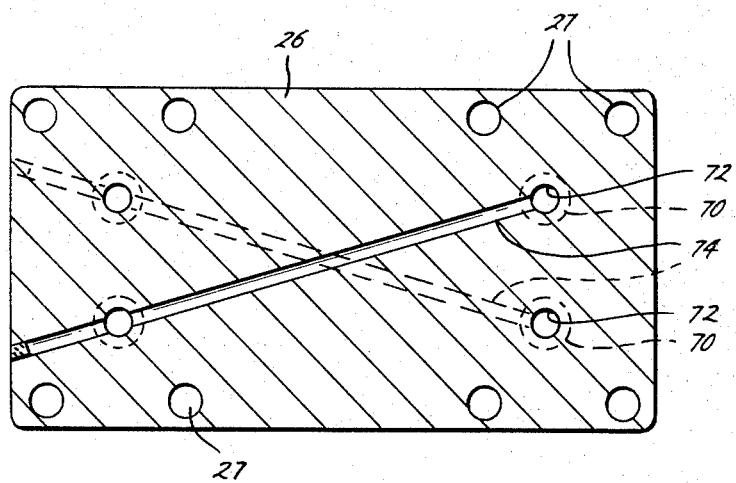
FIG. 4 is a section at plane 4—4 of FIG. 2.

Referring to FIG. 2, the shaft 15 extends through port 20 in transition portion 12 into chamber 22. The chamber 22 is formed between hollow hub 24 at the side of transition portion 11 and block 26 which is suitably secured thereto, e.g. by screws (not shown). FIG. 4 shows the screw holes 27 in the block. The block is sealed to the hub by annular seal ring 28.

The shaft 15 is sealed to port 20 by packing 30 which is compressed against annular shoulder 32 by compression ring 33 which is positioned by plate 34 and screws 36. Bearings to support shaft 15 are provided at 37, 38.

Secured to the chamber end of shaft 15 is a cam 40. As shown best in FIG. 3, cam 40 is adapted to be turned by four pistons 42 loosely fitting (to allow fluid passage therepast) and amounted for reciprocation in four cylinder bores 44. The outer ends of the bores are closed by four screw plugs 46. The inner end of each piston is of smaller diameter than the outer end and is threaded to receive a nut 48. A pin 50 engages a slot 52 in the end of the piston to hold the nut against rotation after its initial adjustment. The nut is adjusted to engage the cam when the diverter valve and the piston are at their travel limits. The nut also may serve as a stop to limit outward travel of the piston by engagement of the nut with shoulder 54. The nut fits loosely within (to allow fluid passage therepast) and reciprocates in the inner end of bore 44 at 56.

Between the inner and outer parts of bore 44 is a conically tapered valve seat 60 adapted to sealingly receive the conically tapered annular seating surface 62 on piston 42, the piston forming a valve closure member. An O-ring 64 is set in an annular groove 66 around the seating surface provides an initial resilient seal with the valve seat.

Referring now to FIG. 4, in the bottom of the block there are four counterbores 70 adapted to recieve O-rings that fit into four counterbores (not shown) in the mouth of the hub 24 (FIG. 2). The four counterbores in hub 24 are at the ends of four passages (not shown) leading to the outer ends of bores 44. The four counterbores 70 in the block are at the ends of four ports 72, diagonally opposite ones of which are interconnected by diagonal passages 74. In this manner diagonally opposite bores 44 are interconnected.

To actuate the diverter valve, two adjacent plugs 46 are removed and replaced with hydraulic lines. Hydraulic fluid can then flow in one line, past the adjacent piston 42 into chamber 22 and also through the block and then past the diagonally opposite piston 42 into chamber 22. From chamber 22 the hydraulic fluid flows out past the other two pistons and then directly (or indirectly through the block) to the other hydraulic line. Such flow causes a pressure drop across the inlet pistons moving them inwardly until their valve ends seat. Such piston motion moves the diverter paddle to its opposite position. By flowing hydraulic fluid into the other line the paddle will be moved back to its opposite position.

Should a string of tools in one branch of the diverter valve try to enter the trunk when the diverter paddle has for some reason been closed against passage through such branch, the tool pressure against the paddle will tend to move the paddle, the cam, and the seated pistons. If the seated pistons move off their seats while hydraulic pressure is still forcing them toward their seats, the O-ring seals may be extruded into the cracks between the seats and valve closure seating surfaces of the pistons. To overcome this problem the construction shown in FIG. 5 was invented.

Figure 3:
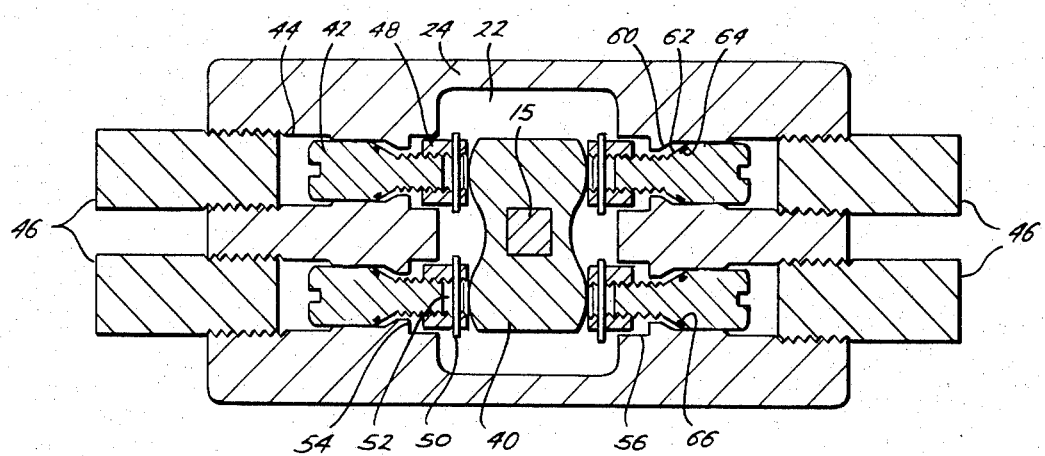
FIG. 3 is a section at plane 3—3 of FIG. 2.

Referring now to FIG. 5, there is shown a piston and valve structure which is the same as that of FIG. 3 except for the valve sealing means. Instead of the rubber O-ring 64 used in FIG. 3, a Teflon seal ring 164 having a protuberant conically tapered outer periphery 163 is used. The outer periphery 163 is tapered at a slightly greater angle, e.g. 1½ to 7½° greater, preferably 2½° greater than the seal taper, e.g. 32½° for the Teflon ring and 30 degrees for the seat. The small diameter end of the ring 164 has the same diameter as the immediately adjacent part of seating surface 161. The large diameter end of ring 163 forms a protuberant annular lip 165 adapted to flex and seal with seat 160 prior to engagement of seating surface 161 and seat 160 either on initial engagement when the valve is closing or, on final engagement when the valve is opening, and especially when the valve is trying to close under fluid pressure but is mechanically pushed off its seat. The construction is advantageous with conically tapered seats and sealing surfaces having taper angles of from 20° to 40°.

Preferably, the Teflon ring has an inner periphery 167 that is cylindrical, to enable the ring to side axially along the cylindrical bottom 168 of the annular groove 170 in which the Teflon ring is received against the metal back up provided by annular radial shoulder 169 against which plane annular face 171 of the Teflon ring bears, shoulder 169 and face 171 preferably being perpendicular to the axis of the Teflon ring so that pressure will not tend to expand or contract the ring radially.

It has been found that despite its greater rigidity and the support of perpendicular face 171 by perpendicular shoulder 169, the ring will expand radially and then extrude under fluid pressure into a crack between seat 160 and seating surface 161 when the valve is forced off its seat, if the pressure is very high, as in the subject diverter valve operator. This is due to pressure fluid leaking in between the upstream face 173 of the ring (shown also to be a plane surface perpendicular to the ring axis) and the radial shoulder 175 of the side of the annular groove in which the Teflon ring is received, (also shown to planar and perpendicular to the ring and groove axis). The fluid then gets between cylindrical inner surface 167 of the Teflon ring and bottom 168 of groove 170 and expands the ring. The added unsupported surface of the ring at the small end thereof then extrudes into the crack between seat 160 and sealing surface 161.

Efforts to overcome the expansion problem by various bonding methods to seal the ring to the valve closure have been unsuccessful, but the problem has been solved by providing an annular rectangular section rabbet 180 at the outer periphery of the large end of the Teflon ring and installing therein an elastomer, e.g. rubber, O-ring 182. Ring 182 is slightly compressed between shoulder 175 of groove 170 and the radial plane perpendicular side 184 of the rabbet. The rabbet is radially deep enough so that the O-ring does not protrude beyond the projection of the cone of seating surface 161 nor the projection of the cylindrical surface 190 of the piston 191. The O-ring 182 therefore does not ever contact the cylinder bore 193 or conical valve seat 160.

The resultant sealing means including Teflon ring 164 and elastomer O-ring 182 is found to solve the problem initially encountered.

Preferably, the Teflon ring is bonded in groove 160, e.g. by curing it in place.

Instead of Teflon (polytetra fluor ethylene) other materials having similar sealing, flexibility, and rigidity physical properties that are resistant to deterioration under ambient conditions may be used. Such material may be called semi-rigid plastics material.

While a preferred embodiment of the invention has been shown and described, modifications within the spirt of the invention can be made by one skilled in the art.

I claim:

1. Sealing arrangement comprising:
   a rigid body having a fluid passage therethrough including a tapered seat,
   a rigid closure having a flaring seating surface,
   said closure being disposed in said body and being free to move between a position in which said seating surface engages said seat and a position in which it is removed from said seat,
   said closure having an annular groove therearound adjacent said seating surface, said seating surface flaring toward said groove,
   a semi-rigid sealing ring disposed in said groove, said ring having a tapered outer periphery flaring in the same direction as said seating surface, said ring including lip means adapted to make initial and final contact with said seat as said closure moves toward and away from said seat, and elastomer seal means between said lip and said groove.

2. Sealing arrangement according to claim 1 in which said tapered seat and said tapered seating surface are both conical and of the same taper angle, the tapered outer periphery of said sealing ring having a diameter equal to that of said seating surface where the two are immediately contiguous, said tapered outer periphery of said sealing ring flaring at a greater angle than said sealing surface, said sealing ring being bonded to said groove in said closure.

3. Sealing arrangement according to claim 1 wherein there is an annular rabbet around the sealing ring at the lip end thereof, said elastomer ring being disposed in said rabbet.

4. Sealing arrangement according to claim 1 wherein the outer periphery of said elastomer ring lies inside of the conical surface defined by the projection of said seating surface and inside of the cylindrical surface defined by axial projection from the periphery of said lip.

5. Sealing arrangement according to claim 1 wherein the inner periphery of said elastomer ring is cylindrical and the bottom of said groove is also cylindrical and the sides of said groove are planar perpendicular to the axis of said piston.

6. Sealing arrangement according to claim 1 wherien said sealing ring is made of "Teflon" and is cured in situ, and said elastomer ring is a rubber O-ring.

7. Sealing arrangement comprising
a vlave closure
a conical metal seating surface on said clsoure,
an annular groove around said closure adjacent the largest diameter part of said seating surface,
said groove having a cylindrical bottom and planar sides,
a Teflon seal ring in said groove,
said ring having a cylindrical inner periphery and planar sides,
said ring having at its outer periphery adjacent said seating surface a conical outer periphery having the same diameter adjacent said seating surface as the adjacent part of said seating surface and a larger taper angle than said seating surface forming at the largest diameter part of said conical outer periphery a protuberant lip,
said ring having a rectangular section annular rabbet at the outer periphery of the ring adjacent said conical outer periphery of the ring, and
a rubber O-ring disposed in said rabbet in compression between and sealing between the rabbetted part of said Teflon ring and the adjacent planar side of said groove, said groove being at least as deep as the depth of said O-ring when compressed therein.

8. Sealing arrangement for a valve, comprising a tapered seat, a closure having a tapered seating surface adapted to engage said seat, a semi-rigid seal ring carried by said closure adjacent the largest diameter part of said seating surface and having a tapered outer periphery including a protuberant lip adapted to engage said seat, and elastomer means adjacent the lip of said seal ring adapted to seal between said ring and said closure to prevent ring enlargement.

9. Sealing arrangement according to claim 8 wherein said seat is annular and said closure includes a projecting portion extending through said seat, said elastomer means sealing said ring to said closure preventing fluid expansion of said seal ring when travel of said projecting portion is blocked preventing full engagement of said closure and seat.

10. Sealing arrangement comprising
a semi-rigid seal ring having an inner periphery, an outer periphery, and two annular oppositely facing sides interconnecting said inner and outer periphery,
a supporting member having an inner portion extending coaxially within said inner periphery,
said supporting member having a first side portion alongside one of said sides of said seal ring,
said outer periphery of the seal ring flaring away from said first side portion of the supporting member,
said first side portion of the supporting member having an outer periphery flaring toward said seal ring and forming a continuation of said outer periphery of said seal ring,
the flare of said outer periphery of said seal ring being greater than that of said outer periphery of said seal ring,
said supporting member having a second side portion alongside the other of said sides of the seal ring, and
an elastomer ring means disposed under compression between said second side portion of said supporting member and the adjacent portion of said seal ring to seal between said seal ring and supporting member to prevent fluid pressure entering therebetween and acting outwardly on said seal ring tending to expand the ring radially away from said supporting member.

11. Sealing arrangement comprising
a valve closure
an annular tapered metal seating surface on said closure,
an annular groove around said closure adjacent said tapered seating surface, said tapered seating surface flaring toward said groove,
a semi-rigid seal ring carried by said closure having its inner periphery lying in said groove,
said ring having at its outer periphery adjacent said seating surface a tapered outer periphery flaring in the same direction as said tapered seating surface but with greater angularity forming at the largest diameter part of said tapered outer periphery of the ring a protuberant lip, and
an annular elastomer seal means in said groove between the side of said ring nearest the lip thereof and the adjacent side of said groove to prevent fluid from getting to a surface on said ring where it can exert a radially outward pressure on said ring tending to expand the ring.

* * * * *